Aug. 6, 1968 E. WILLDIG Re. 26,437
MASS SPECTROMETER ASSEMBLIES
Original Filed Sept. 11, 1962
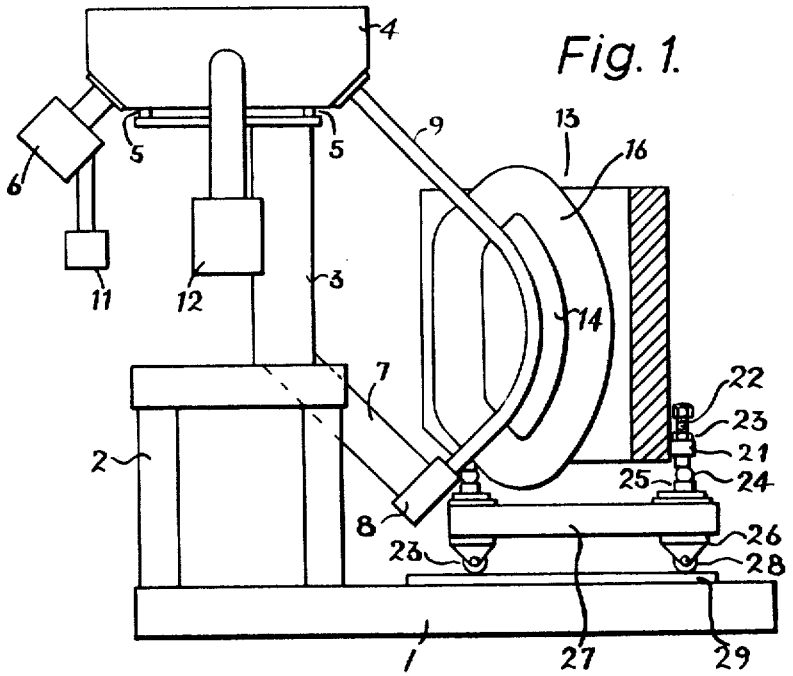
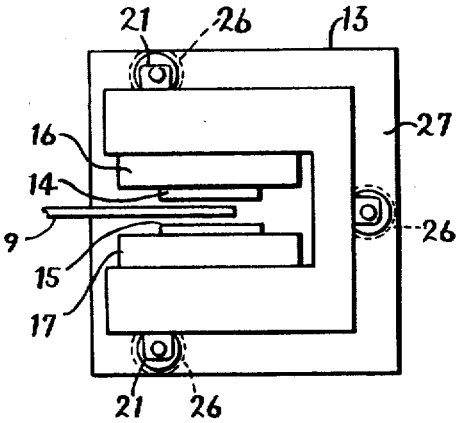
INVENTOR:
Edward Willdig
By:
Pillars and Bowyer
ATTORNEY United States Patent Office Re. 26,437
Reissued Aug. 6, 1968

26,437
MASS SPECTROMETER ASSEMBLIES

Edward Willdig, Stretford, England, assignor to Associated Electrical Industries Limited, London, England, a British company Original No. 3,187,180, dated June 1, 1965, Ser. No. 222,841, Sept. 11, 1962. Application for reissue May 16, 1967, Ser. No. 646,746

6 Claims. (Cl. 250—41.9)

Matter enclosed in heavy brackets [ ] appears in the original patent but forms no part of this reissue specification; matter printed in italics indicates the additions made by reissue.

*ABSTRACT OF THE DISCLOSURE*

*A mass spectrometer assembly comprises an ion source, a collector, and conduit means extending from the ion source to the collector, all supported by a rigid support frame, and a magnetic analyzer support independently of the frame. The support for the magnetic analyzer comprises a mechanism having at least three points of support for the magnet and adjustable at each of the points to vary the angular position of the magnet. The support mechanism is in turn supported on a movable trolley so the magnetic analyzer may b emoved toward and away from the spectrometer conduit means.*

The present invention relates to mass spectrometer assemblies.

In a mass spectrometer it is essential to locate the components accurately relative to each other. In particular it is important to locate the ion source and the collector assembly accurately relative to each other and to locate the electrostatic analyzer, if it is a double focussing mass spectrometer, accurately relative to the ion source and the collector.

The magnetic analyzer assembly may include a heavy magnet and this must be located accurately relative to the other components and is preferably provided with moving means so that the position of the magnetic field can be varied. Preferably the magnet assembly can be moved without affecting the positions of the other components of the spectrometer.

The object of the present invention is to provide an improved mass spectrometer assembly.

According to the present invention a mass spectrometer assembly comprises an ion source, an electrostatic analyzer and a collector, all supported on a frame, a duct for the passage of ions extending between said electrostatic analyzer and said collector, a magnetic analyzer assembly adapted to produce a magnetic field within at least part of said duct, and means independent of said frame for supporting said magnetic analyzer assembly and for moving said magnetic analyzer assembly relative to said frame so as to vary the position of said magnetic field.

Preferably all the components of the mass spectrometer assembly are located so that the beam of ions travels through the spectrometer in a substantially vertical plane.

In order that the invention may be more readily understood reference will now be made to the accompanying drawing in which:

FIG. 1 is a side view partly in section of a mass spectrometer assembly embodying the invention; and FIG. 2 is a plan view of the magnet assembly of the mass spectrometer illustrated in FIG. 1.

With reference to FIG. 1 the mass spectrometer assembly comprises a rigid base plate 1 on which is mounted a frame 2 for supporting some of the components of the spectrometer. A support 3 extends upwardly from the frame 2 and an electrostatic analyzer is mounted at the upper end of the support 3 on suitable heat chokes 5. An ion source 6 is attached to the inlet end of the electrostatic analyzer.

A second rigid support 7 extends from the support 3 and supports an ion collector assembly 8. A duct 9 extends between the outlet end of the electrostatic analyzer and the ion collector and lies in a substantially vertical plane. The electrostatic analyzer is also preferably located so that the ions travel through it in a substantially vertical plane. The duct 9 is vacuum tight but is conveniently flexible so as to allow a small amount of relative movement between the electrostatic analyzer and the ion collector in order to provide for accurate relative positioning of these two components.

Two evacuating pumps 11, 12 are connected to the ion source and the electrostatic analyzer in order to evacuate the sealed system provided by the ion source 6, the electrostatic analyzer 4, the duct 9 and the ion collector 8. The mass spectrometer assembly will also include suitable power supplies and control circuits for causing a beam of ions produced from a sample in the ion source to pass through the electrostatic analyzer into the duct 9. The spectrometer assembly also includes a magnetic analyzer which operates on the ions in the duct 9, causing deflection of the ions so that they pass into the collector 8.

The magnetic analyzer assembly which includes a heavy magnet 13 is supported on the base plate 1 so that any movement of the magnet, in order to locate the magnetic field accurately, will not cause distortion of the frame 2 supporting the remaining components.

As seen in FIG. 2 the core of the magnet 13 is C-shaped in plan and the two arms of the core are located on either side of the duct 9. The core includes two pole pieces 14, 15 surrounded respectively by coils 16, 17. The shapes of the pole pieces and the coils are more easily seen in FIG. 1. The magnet core is supported at three points by three identical supporting devices. Each supporting device comprises a lug 21 attached to the magnet core, a threaded rod 22 engaging in a threaded aperture in the lug 21, a lock nut 23, a steel ball 24 and a screw jack 25. The steel ball is located between the lower end of the rod 22 and the screw jack 25. The screw jack 25 is mounted on a jack nut 26. All three jack nuts 26 are supported on a trolley 27.

The magnet core is adjustable for height relative to the jacks 25 by individual adjustment of the rods 22 in the lugs 21, and therefore the orientation of the magnetic field between the pole pices can be varied as required. The lock nuts 23 are used to lock the rods 22 when the required position has been determined.

In addition the three jacks 25 can be rotated simultaneously within their respective nuts 26 by a suitable chain drive so as to raise or lower the magnet in a vertical direction without any tilting of the magnet. The trolley 27 is mounted on rollers 28 engaging in runners 29 on the base plate 1 so that the whole magnet core can be moved laterally away from, or towards the remaining components of the mass spectrometer. Suitable scales and indicating pointers are provided for indicating the position of the magnet assembly. The base plate may be extended by temporary runners in order that the magnet assembly may be completely removed from the remaining componets, so that the duct 9 can be baked out at a high temperature. A suitable disengaging mechanism is provided to ensure that the magnet is returned accurately to its original position after the baking.

With the arrangement of the mass spectrometer described above the magnet of the magnetic analyzer is supported quite independently of the remaining components of the mass spectrometer, and can be moved independently of the remaining components in order to provide the correct magnetic focussing of the ions.

The above described mass spectrometer layout has a number of advantages over known layouts. In particular the arrangement of the components extending vertically instead of horizontally as in known layouts provides an economy of floor space which is important in an analytical chemical laboratory in which this type of instrument has a particular use.

By arranging for the magnetic assembly to be movable relative to the other components of the instrument, the construction is simplified. The essential focusing adjustments involving movement of the magnet can be carried out without altering the position of the other components and this may be particularly advantageous when a fixed glass sample introduction system is connected to the ion source. Easy movement of the magnet away from the other components also simplifies the fitting or replacement of heaters in the magnetic analyzer section of the duct 9 and enables the other components to be baked to a high temperature without the loss of heat to the magnetic poles being a limiting factor.

The mounting of all the components other than the magnetic assembly on one frame lends itself to quantity production techniques because the initial positioning of the collector assembly relative to the electrostatic analyzer can be by a jig. This form of construction can also be followed with a variety of sizes of instrument. The construction also enables either or both of the electrostatic and magnetic analyzer sections of the vacuum path to be baked without danger of permanent distortion and without significantly affecting the relative positions of the electrostatic analyzer, collector and magnet during baking.

What I claim is:

1. A mass spectrometer assembly comprising an ion source, an electrostatic analyzer and a collector, a rigid supporting frame, means for supporting from said frame said ion source, said electrostatic analyzer and said collector so that ions from said source can travel through said electrostatic analyzer in a substantially vertical plane, a duct for the passage of ions extending between said electrostatic analyzer and said collector in a substantially vertical plane, a magnetic analyzer assembly including a magnet adapted to produce a magnetic field extending substantially horizontally through at least part of said duct, means independent of said frame for supporting said magnetic analyzer and for moving said magnet so as to vary the position of said magnetic field relative to said duct, the means for mounting the magnet comprising a three point supporting mechanism for the magnet and in which each of the three mechanism is independently adjustable to vary the angular position of the magnet with respect to the duct.

2. The structure of claim 1 in which means are additionally provided for simultaneously adjusting all three mechanisms.

*3. A mass spectrometer assembly comprising:*

*(a) an ion source;*

*(b) a collector;*

*(c) conduit means extending from the ion source to the collector and defining a path of ion travel;*

*(d) a rigid support frame means for supporting said ion source, said collector, and said conduit means, from said frame so that ions from said source can travel along said conduit means to said collector;*

*(e) said conduit means including a duct for the passage of ions extending between said ion source and said collector;*

*(f) a magnetic analyzer assembly including a magnet adapted to produce a magnetic field extending substantially horizontally through at least a part of said duct;*

*(g) support means independent of said frame for supporting said magnetic analyzer and for moving said magnet so as to vary the position of the magnetic field relative to said duct, the support means comprising*

*(i) a support mechanism having a plurality of threaded rods for supporting said magnet at at least three points and being adjustable at each of said points to vary angular position of said magnet with respect to said duct,*

*(ii) movable trolley means for supporting said threaded rods, and*

*(iii) a plurality of balls equal in number to said plurality of threaded rods, the balls being respectively interposed between said threaded rods and said trolley means.*

*4. The assembly of claim 3, wherein said trolley means includes a plurality of screw jacks equal to said plurality of threaded rods and balls and each supporting a respective threaded rod with a ball interposed therebetween.*

*5. The assembly of claim 4, wherein said trolley means is mounted on rollers.*

*6. The assembly of claim 3, wherein said trolley means is mounted on rollers.*

References Cited

The following references, cited by the Examiner, are of record in the patented file of this patent or the original patent.

UNITED STATES PATENTS

| | | | |
|---|---|---|---|
| 3,084,249 | 4/1963 | Enge | 250—41.9 |
| 2,447,260 | 8/1948 | Marton | 250—41.9 X |
| 2,593,508 | 4/1952 | Washburn | 250—41.9 |

OTHER REFERENCES

Browne et al.: Broad Range Magnetic Spectrograph, Review of Scientific Instruments, vol. 27, No. 11, November 1956, 899 to 907.

Nier: A Mass Spectrometer for Routine Isotope Abundance Measurements, Review of Scientific Instruments, vol. 11, No. 7, July 1940, pp. 212 to 216.

WILLIAM F. LINDQUIST, *Primary Examiner.*